United States Patent
Jorgenson et al.

(10) Patent No.: US 12,085,216 B2
(45) Date of Patent: Sep. 10, 2024

(54) MULTI-USE FUEL FILLER TUBE

(71) Applicant: Arctic Cat Inc., Thief River Falls, MN (US)

(72) Inventors: Kristopher Jon Jorgenson, Argyle, MN (US); Darin Dwayne Jacobson, Newfolden, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 17/674,750

(22) Filed: Feb. 17, 2022

(65) Prior Publication Data
US 2023/0258287 A1 Aug. 17, 2023

(51) Int. Cl.
*F16L 9/12* (2006.01)
*B60K 15/03* (2006.01)
*B60K 15/04* (2006.01)

(52) U.S. Cl.
CPC ...... *F16L 9/12* (2013.01); *B60K 2015/03032* (2013.01); *B60K 2015/03493* (2013.01); *B60K 15/04* (2013.01)

(58) Field of Classification Search
CPC ........ B60K 15/035; B60K 2015/03575; B60K 2015/03552; B60K 2015/03538; B60K 2015/03576; B60K 2015/03105; B60K 2015/0344
USPC ...................... 220/563, 562, 86.2, 86.3, 86.1
See application file for complete search history.

(56) References Cited

U.S. PATENT DOCUMENTS

| | | | |
|---|---|---|---|
| 1,640,722 A | 8/1927 | Roaten et al. |
| 2,363,098 A | 11/1944 | Tullis |
| 2,363,099 A | 11/1944 | Tullis |
| 2,816,433 A | 12/1957 | Friend |
| 2,859,612 A | 11/1958 | Morse |
| 2,885,025 A | 5/1959 | O'Dell |
| 3,167,623 A | 1/1965 | Kaleta |
| 3,537,283 A | 11/1970 | Mross |
| 3,601,107 A | 8/1971 | Rohrbacher et al. |
| 3,615,036 A | 10/1971 | Mross |
| 3,630,407 A | 12/1971 | Mross |
| 3,645,244 A | 2/1972 | Seyfarth |
| 3,703,166 A | 11/1972 | White, Jr. et al. |

(Continued)

FOREIGN PATENT DOCUMENTS

| | | |
|---|---|---|
| AU | 198171179 A | 2/1982 |
| AU | 664804 B | 11/1995 |

(Continued)

*Primary Examiner* — Steven A. Reynolds
*Assistant Examiner* — Prince Pal
(74) *Attorney, Agent, or Firm* — Lowe Graham Jones PLLC (57) ABSTRACT

A fuel tube filler neck includes a first thread is formed on an inner surface and a second thread formed on an outer surface. The first thread, second thread, and tube may be co-molded of thermoplastic (e.g., nylon) and the first and second thread may overlap one another. The outer surface includes a cylindrical portion and a recessed portion, the second thread being formed on the recessed portion. Attachment structures are secured to the fuel tube for mounting the fuel tube to a fuel tank. A first type of fuel cap is engaged with the first thread and a second type of fuel cap is engaged with the second thread. Vehicles with different types of fuel caps may be shipped to different geographic regions.

1 Claim, 4 Drawing Sheets

(56) References Cited

U.S. PATENT DOCUMENTS

| | | | |
|---|---|---|---|
| 3,703,998 A | 11/1972 | Girard | |
| 3,802,596 A | 4/1974 | Schmidt | |
| 3,831,801 A | 8/1974 | Rodgers | |
| 3,937,357 A | 2/1976 | Burgess | |
| 3,985,260 A | 10/1976 | Evans | |
| 4,000,632 A | 1/1977 | Summan | |
| 4,000,633 A | 1/1977 | Evans | |
| 4,065,026 A | 12/1977 | Williams et al. | |
| 4,113,138 A | 9/1978 | Fields et al. | |
| 4,133,346 A | 1/1979 | Smith et al. | |
| 4,262,712 A | 4/1981 | Young | |
| 4,317,345 A | 3/1982 | Hinson | |
| 4,343,410 A | 8/1982 | Lenda | |
| 4,360,122 A | 11/1982 | Sullivan | |
| 4,565,173 A | 1/1986 | Oshiage et al. | |
| 4,572,120 A | 2/1986 | Matsumoto | |
| 4,579,247 A | 4/1986 | Hasui et al. | |
| 4,589,381 A | 5/1986 | Takayama | |
| 4,610,284 A | 9/1986 | Bartholomew | |
| 4,615,305 A | 10/1986 | Matsumoto | |
| 4,638,919 A | 1/1987 | Feenick | |
| 4,643,008 A | 2/1987 | Lissau | |
| 4,678,097 A * | 7/1987 | Crute | B60K 15/0406 220/288 |
| 4,708,674 A | 11/1987 | Matsumoto | |
| RE32,593 E | 2/1988 | Matsumoto | |
| 4,726,346 A | 2/1988 | Lucht | |
| 4,730,652 A | 3/1988 | Bartholomew | |
| 4,746,089 A | 5/1988 | Clapper | |
| 4,768,677 A * | 9/1988 | Kitsukawa | B60K 15/0406 220/288 |
| 4,773,884 A | 9/1988 | Matsumoto | |
| 4,777,990 A | 10/1988 | Grant | |
| 4,779,638 A | 10/1988 | Nitzberg et al. | |
| 4,787,528 A | 11/1988 | Harris et al. | |
| 4,791,961 A | 12/1988 | Nitzberg et al. | |
| 4,796,777 A | 1/1989 | Keller | |
| 4,800,913 A | 1/1989 | Nitzberg et al. | |
| 4,827,960 A | 5/1989 | Nitzberg et al. | |
| 4,827,961 A | 5/1989 | Nitzberg et al. | |
| 4,884,716 A | 12/1989 | Steiner | |
| 4,896,789 A | 1/1990 | Federspiel | |
| 4,971,118 A | 11/1990 | Cluff | |
| 5,018,546 A | 5/1991 | Carmack et al. | |
| 5,048,577 A | 9/1991 | Kuusisto | |
| 5,070,686 A | 12/1991 | Isaka et al. | |
| 5,110,003 A | 5/1992 | MacWilliams | |
| 5,122,264 A | 6/1992 | Mohr et al. | |
| 5,149,287 A | 9/1992 | Koike | |
| 5,179,926 A | 1/1993 | Ament | |
| 5,192,430 A | 3/1993 | Mohr | |
| 5,197,444 A | 3/1993 | Lang et al. | |
| 5,230,372 A | 7/1993 | Westphal | |
| 5,395,004 A | 3/1995 | Griffin et al. | |
| 5,431,199 A | 7/1995 | Benjay et al. | |
| 5,480,055 A | 1/1996 | Harris et al. | |
| 5,505,076 A | 4/1996 | Parkman et al. | |
| 5,542,398 A | 8/1996 | Marcon | |
| 5,568,828 A | 10/1996 | Harris | |
| 5,575,397 A | 11/1996 | Wood | |
| 5,623,907 A | 4/1997 | Cotton et al. | |
| 5,628,294 A | 5/1997 | Krieckaert et al. | |
| 5,641,344 A | 6/1997 | Takahashi et al. | |
| 5,647,328 A | 7/1997 | Fournier et al. | |
| 5,647,329 A | 7/1997 | Bucci et al. | |
| 5,660,206 A | 8/1997 | Neal et al. | |
| 5,713,336 A | 2/1998 | King et al. | |
| 5,732,840 A | 3/1998 | Foltz | |
| 5,755,211 A | 5/1998 | Koch | |
| 5,775,281 A | 7/1998 | Smith | |
| 5,794,805 A | 8/1998 | Branham | |
| 5,832,905 A | 11/1998 | King et al. | |
| 5,850,819 A | 12/1998 | Kunimitsu et al. | |
| 5,881,701 A | 3/1999 | King et al. | |
| 5,928,745 A | 7/1999 | Wood et al. | |
| 5,952,559 A | 9/1999 | Harris et al. | |
| 5,954,031 A | 9/1999 | Ogiso et al. | |
| 5,996,402 A | 12/1999 | Harris | |
| 6,033,273 A | 3/2000 | Nozue et al. | |
| 6,056,140 A | 5/2000 | Muth et al. | |
| 6,059,619 A | 5/2000 | Nozue | |
| 6,067,951 A | 5/2000 | Kitajima | |
| 6,112,714 A | 9/2000 | Brister | |
| 6,119,801 A | 9/2000 | Yamashita et al. | |
| 6,182,631 B1 | 2/2001 | Kitajima et al. | |
| 6,197,858 B1 | 3/2001 | Hagano et al. | |
| 6,223,792 B1 * | 5/2001 | Slagle | B65D 47/243 141/345 |
| 6,230,549 B1 | 5/2001 | Harris | |
| 6,260,516 B1 | 7/2001 | Brister | |
| 6,302,169 B1 | 10/2001 | Pulos | |
| 6,321,692 B1 | 11/2001 | Rayner | |
| 6,325,233 B1 * | 12/2001 | Harris | B60K 15/0406 220/288 |
| 6,327,898 B1 | 12/2001 | Harris | |
| 6,332,555 B1 | 12/2001 | Stangier | |
| 6,357,618 B1 * | 3/2002 | Kloess | B60K 15/03177 220/86.1 |
| 6,378,297 B1 | 4/2002 | Ito et al. | |
| 6,397,791 B1 | 6/2002 | Brister | |
| 6,397,907 B1 * | 6/2002 | Heintz | B67C 11/02 141/331 |
| RE37,776 E * | 7/2002 | Foltz | B67D 7/0401 220/203.02 |
| 6,446,826 B1 | 9/2002 | Foltz et al. | |
| 6,447,273 B1 | 9/2002 | Nishimura et al. | |
| 6,457,463 B1 | 10/2002 | McChesney et al. | |
| 6,474,376 B2 | 11/2002 | Hagano et al. | |
| 6,494,190 B1 | 12/2002 | Cohen | |
| 6,502,607 B2 | 1/2003 | Brown et al. | |
| 6,508,374 B1 | 1/2003 | Griffin et al. | |
| 6,516,964 B1 | 2/2003 | Gerhardt et al. | |
| 6,526,938 B1 | 3/2003 | Bylsma et al. | |
| 6,543,423 B2 | 4/2003 | Dobryden et al. | |
| 6,568,970 B2 | 5/2003 | Berthiaume et al. | |
| 6,575,131 B2 | 6/2003 | Brister | |
| 6,592,415 B2 | 7/2003 | Berthiaume | |
| 6,668,804 B2 | 12/2003 | Dobryden et al. | |
| 6,679,396 B1 | 1/2004 | Foltz et al. | |
| 6,681,817 B2 | 1/2004 | Hagano et al. | |
| 6,702,160 B1 | 3/2004 | Griffith | |
| 6,711,893 B2 | 3/2004 | Ueda et al. | |
| 6,714,856 B2 | 3/2004 | Huff et al. | |
| 6,718,948 B2 | 4/2004 | Vahle et al. | |
| 6,726,458 B2 | 4/2004 | Hervault | |
| 6,755,316 B2 | 8/2004 | Ono et al. | |
| 6,786,194 B2 | 9/2004 | Koegler et al. | |
| 6,814,062 B2 | 11/2004 | Esteghlal et al. | |
| 6,830,085 B1 | 12/2004 | Majewski | |
| 6,840,549 B1 * | 1/2005 | Smith | F16L 15/008 285/148.21 |
| 6,877,632 B2 | 4/2005 | Gerdes | |
| 6,880,392 B2 | 4/2005 | Lee et al. | |
| 6,925,990 B1 | 8/2005 | Konopacki | |
| 6,935,389 B1 * | 8/2005 | Rinaldi | B65B 39/02 141/337 |
| 6,953,527 B2 | 10/2005 | Brower et al. | |
| 6,994,075 B2 | 2/2006 | Penschuck | |
| 7,048,019 B2 * | 5/2006 | Pacitto, Jr. | B60K 15/04 141/286 |
| 7,048,140 B1 | 5/2006 | Caldwell | |
| 7,059,187 B2 | 6/2006 | Clarke, III et al. | |
| 7,131,430 B2 | 11/2006 | Rado et al. | |
| 7,131,469 B2 | 11/2006 | Dunkle | |
| 7,165,536 B2 | 1/2007 | Kirk et al. | |
| 7,210,325 B2 | 5/2007 | Brieschke et al. | |
| 7,246,642 B2 | 7/2007 | Foltz et al. | |
| 7,258,105 B2 | 8/2007 | Kangler | |
| 7,266,439 B2 | 9/2007 | Wang et al. | |
| 7,267,112 B2 | 9/2007 | Donahue et al. | |
| 7,302,933 B2 | 12/2007 | Kerns | |
| 7,322,337 B1 | 1/2008 | Brister et al. | |
| 7,322,338 B1 | 1/2008 | Brister et al. | |

(56) References Cited

U.S. PATENT DOCUMENTS

| | | | |
|---|---|---|---|
| 7,338,541 B2 | 3/2008 | Connor et al. | |
| 7,357,101 B2 | 4/2008 | Boyarski | |
| 7,367,223 B2 | 5/2008 | Kettl et al. | |
| 7,370,609 B2 | 5/2008 | Kamio | |
| 7,424,881 B2 | 9/2008 | Kerns | |
| 7,445,070 B1 | 11/2008 | Pickering | |
| 7,464,696 B2 | 12/2008 | Furusawa et al. | |
| 7,556,025 B2 | 7/2009 | Sotiriades | |
| 7,575,124 B2* | 8/2009 | Nakai | B60K 15/0406 |
| | | | 220/288 |
| 7,584,740 B2 | 9/2009 | Boyarski | |
| 7,635,013 B2* | 12/2009 | Ballinger | B67C 11/00 |
| | | | 141/331 |
| 7,650,778 B2 | 1/2010 | Puckett et al. | |
| 7,650,779 B2 | 1/2010 | Puckett et al. | |
| 7,690,336 B2 | 4/2010 | Bowman et al. | |
| 7,699,356 B2* | 4/2010 | Bucher | F16L 37/0885 |
| | | | 285/244 |
| 7,703,435 B2 | 4/2010 | Surnilla et al. | |
| 7,720,592 B2 | 5/2010 | Leone | |
| 7,726,265 B2 | 6/2010 | Bromberg et al. | |
| 7,735,672 B2 | 6/2010 | Voss, III | |
| 7,770,560 B2 | 8/2010 | Ulrey et al. | |
| 7,774,125 B2 | 8/2010 | Scharfenberg | |
| 7,779,808 B2 | 8/2010 | Kurotani et al. | |
| 7,783,435 B2 | 8/2010 | Hillam et al. | |
| 7,789,047 B2 | 9/2010 | Kuroki et al. | |
| 7,789,063 B2 | 9/2010 | Lewis et al. | |
| 7,841,315 B1 | 11/2010 | Brister et al. | |
| 7,866,357 B2 | 1/2011 | Compere et al. | |
| 7,869,930 B2 | 1/2011 | Stein et al. | |
| 7,877,189 B2 | 1/2011 | Leone | |
| 7,895,890 B2 | 3/2011 | Van Ee | |
| 7,933,713 B2 | 4/2011 | Leone | |
| 7,957,888 B2 | 6/2011 | Leone et al. | |
| 8,056,589 B2 | 11/2011 | Novak et al. | |
| 8,078,386 B2 | 12/2011 | Stein et al. | |
| 8,109,399 B1* | 2/2012 | Sheffield | B65D 51/24 |
| | | | 215/390 |
| 8,118,009 B2 | 2/2012 | Pursifull et al. | |
| 8,150,599 B2 | 4/2012 | Nishimura | |
| 8,161,732 B2 | 4/2012 | Peters et al. | |
| 8,196,567 B2 | 6/2012 | Pursifull et al. | |
| 8,201,587 B2 | 6/2012 | Bonner | |
| 8,201,588 B2 | 6/2012 | Bonner | |
| 8,214,129 B2 | 7/2012 | Pursifull | |
| 8,240,277 B1 | 8/2012 | Michikawauchi et al. | |
| 8,312,867 B2 | 11/2012 | Pursifull et al. | |
| 8,317,049 B2 | 11/2012 | Piotrowski et al. | |
| 8,375,724 B2 | 2/2013 | Barve et al. | |
| 8,382,187 B2 | 2/2013 | Guendouz et al. | |
| 8,430,261 B2 | 4/2013 | Eggenreich et al. | |
| 8,435,334 B2 | 5/2013 | Hart et al. | |
| 8,443,851 B2 | 5/2013 | Novak et al. | |
| 8,459,238 B2 | 6/2013 | Pursifull et al. | |
| 8,516,991 B2 | 8/2013 | Tanno et al. | |
| 8,516,997 B2 | 8/2013 | Pursifull | |
| 8,517,216 B2* | 8/2013 | MacDougall | B65D 47/123 |
| | | | 222/481.5 |
| 8,578,957 B2 | 11/2013 | Wolff | |
| 8,578,974 B2 | 11/2013 | Bonner | |
| 8,590,515 B2 | 11/2013 | Young et al. | |
| 8,600,646 B2 | 12/2013 | Haft et al. | |
| 8,635,991 B2 | 1/2014 | Pursifull | |
| 8,636,163 B2 | 1/2014 | Gebert et al. | |
| 8,689,987 B2* | 4/2014 | Lewis | A61J 9/00 |
| | | | 215/276 |
| 8,740,002 B2 | 6/2014 | Ripberger, Jr. et al. | |
| 8,776,764 B2 | 7/2014 | Basmaji et al. | |
| 8,800,611 B2 | 8/2014 | Tsiberidis | |
| 8,805,607 B2 | 8/2014 | Smither | |
| 8,807,098 B1 | 8/2014 | Louis | |
| 8,820,562 B2* | 9/2014 | Kito | B29C 45/1657 |
| | | | 220/378 |
| 8,857,643 B2 | 10/2014 | Fetzer | |
| 8,875,754 B2* | 11/2014 | Eyre | B67C 11/00 |
| | | | 141/338 |
| 8,910,677 B1 | 12/2014 | Carpenter | |
| 8,944,269 B2 | 2/2015 | Green | |
| 9,080,517 B2 | 7/2015 | Guido et al. | |
| 9,103,286 B2 | 8/2015 | Bidner et al. | |
| 9,129,202 B2 | 9/2015 | Kelrich | |
| 9,133,782 B1 | 9/2015 | Convisser et al. | |
| 9,169,115 B2 | 10/2015 | Stefan et al. | |
| 9,187,309 B1* | 11/2015 | Krechowiecki | B67D 7/04 |
| 9,188,096 B2 | 11/2015 | Usui et al. | |
| 9,212,643 B2 | 12/2015 | Deliyski | |
| 9,217,405 B2 | 12/2015 | Sumilla et al. | |
| 9,228,880 B2 | 1/2016 | Murnane, Jr. et al. | |
| 9,234,452 B2 | 1/2016 | Stockner et al. | |
| 9,255,557 B2 | 2/2016 | Park et al. | |
| 9,273,654 B2 | 3/2016 | Surnilla et al. | |
| 9,310,349 B2 | 4/2016 | Balsdon et al. | |
| 9,315,099 B2 | 4/2016 | Whelan et al. | |
| 9,316,161 B2 | 4/2016 | Surnilla et al. | |
| 9,322,373 B2 | 4/2016 | Hill et al. | |
| 9,340,106 B2 | 5/2016 | Dudar et al. | |
| 9,341,148 B2 | 5/2016 | Gartzke et al. | |
| 9,366,195 B2 | 6/2016 | Wager et al. | |
| 9,366,562 B2 | 6/2016 | Murnane, Jr. et al. | |
| 9,376,969 B2 | 6/2016 | Yang et al. | |
| 9,376,989 B2 | 6/2016 | Peters et al. | |
| 9,433,147 B2 | 9/2016 | Schmalz | |
| 9,441,561 B2 | 9/2016 | Yeager | |
| 9,441,999 B2 | 9/2016 | Saavedra | |
| 9,457,651 B2 | 10/2016 | Lindlbauer et al. | |
| 9,457,789 B2 | 10/2016 | Assaf et al. | |
| 9,462,747 B2 | 10/2016 | Schmalz | |
| 9,482,191 B2 | 11/2016 | Yang et al. | |
| 9,493,646 B2 | 11/2016 | Luo et al. | |
| 9,494,074 B2 | 11/2016 | Jaasma et al. | |
| 9,494,090 B2 | 11/2016 | Assaf et al. | |
| 9,494,260 B2 | 11/2016 | Luo et al. | |
| 9,506,409 B2 | 11/2016 | Ten Broeke et al. | |
| 9,506,417 B2 | 11/2016 | Ulrey et al. | |
| 9,506,441 B2 | 11/2016 | Smither | |
| 9,528,474 B2 | 12/2016 | Leone et al. | |
| 9,587,578 B2 | 3/2017 | Sumilla et al. | |
| 9,599,072 B2 | 3/2017 | Dudar | |
| 9,611,814 B2 | 4/2017 | Dudar | |
| 9,618,381 B1 | 4/2017 | Dudar | |
| 9,644,552 B2 | 5/2017 | Dudar | |
| 9,657,680 B2 | 5/2017 | Surnilla et al. | |
| 9,662,971 B1 | 5/2017 | Keefer | |
| 9,664,127 B2 | 5/2017 | Dudar | |
| 9,664,147 B2 | 5/2017 | Leone et al. | |
| 9,688,525 B2* | 6/2017 | Steinmann | B60K 15/01 |
| 9,689,320 B2 | 6/2017 | Yagi et al. | |
| 9,694,532 B2 | 7/2017 | McKenzie et al. | |
| 9,695,764 B1 | 7/2017 | Christiansen et al. | |
| 9,701,194 B2 | 7/2017 | Groom | |
| 9,732,685 B2 | 8/2017 | Dudar | |
| 9,751,395 B2 | 9/2017 | Faruque et al. | |
| 9,751,396 B2 | 9/2017 | Dudar et al. | |
| 9,751,398 B2* | 9/2017 | Brown | B60K 15/03177 |
| 9,752,521 B2 | 9/2017 | Dudar | |
| 9,764,637 B2 | 9/2017 | Brown et al. | |
| 9,765,717 B2 | 9/2017 | Guerreiro | |
| 9,770,980 B2 | 9/2017 | Dudar et al. | |
| 9,776,481 B2 | 10/2017 | Deckard et al. | |
| 9,789,760 B2 | 10/2017 | Mizukura | |
| 9,809,441 B2 | 11/2017 | Dudar et al. | |
| 9,856,830 B2 | 1/2018 | Dudar | |
| 9,862,265 B2 | 1/2018 | Lee et al. | |
| 9,869,281 B2 | 1/2018 | Cai et al. | |
| 9,873,322 B2 | 1/2018 | Frank et al. | |
| 9,878,898 B2 | 1/2018 | Zweifel | |
| 9,885,599 B2 | 2/2018 | Murnane, Jr. et al. | |
| 9,909,513 B2 | 3/2018 | Bzymek et al. | |
| 9,914,633 B2 | 3/2018 | McAvey | |
| 9,932,912 B2 | 4/2018 | Walker et al. | |
| 9,932,944 B2 | 4/2018 | Yang et al. | |
| 9,970,367 B2 | 5/2018 | Dudar et al. | |

(56) References Cited

U.S. PATENT DOCUMENTS

| | | |
|---|---|---|
| 9,989,018 B2 | 6/2018 | Dudar |
| 10,001,070 B2 | 6/2018 | Sujan et al. |
| 10,006,413 B2 | 6/2018 | Dudar et al. |
| 10,018,154 B2 | 7/2018 | Kim et al. |
| 10,023,322 B2 | 7/2018 | Keefer et al. |
| 10,040,448 B2 | 8/2018 | Dudar |
| 10,047,705 B2 | 8/2018 | Dudar et al. |
| 10,052,945 B2 | 8/2018 | Kimura et al. |
| 10,060,379 B2 | 8/2018 | Dudar |
| 10,066,569 B2 | 9/2018 | Kawabe et al. |
| 10,145,340 B1 | 12/2018 | Dudar |
| 10,161,347 B2 | 12/2018 | Surnilla et al. |
| 10,167,823 B2 | 1/2019 | Dudar |
| 10,184,440 B2 | 1/2019 | Caley |
| 10,190,348 B2 | 1/2019 | Pearce et al. |
| 10,190,523 B2 | 1/2019 | Russ et al. |
| 10,197,000 B1 | 2/2019 | Dudar |
| 10,202,950 B2 | 2/2019 | Huwyler et al. |
| 10,207,553 B2 | 2/2019 | Thompson et al. |
| 10,288,013 B2 | 5/2019 | Dudar |
| 10,301,166 B2 | 5/2019 | Dudar |
| 10,316,600 B2 | 6/2019 | Yang et al. |
| 10,322,768 B2 | 6/2019 | Morotomi et al. |
| 10,328,792 B2 | 6/2019 | Lee et al. |
| 10,344,895 B2 | 7/2019 | Böcker et al. |
| 10,358,556 B2 | 7/2019 | Luo et al. |
| 10,364,763 B2 | 7/2019 | Dudar |
| 10,371,102 B2 | 8/2019 | Dudar |
| 10,385,812 B2 | 8/2019 | Huwyler et al. |
| 10,451,010 B2 | 10/2019 | Dudar |
| 10,479,195 B2 | 11/2019 | Sekihara et al. |
| 10,486,528 B2 | 11/2019 | Visarius et al. |
| 10,501,626 B2 | 12/2019 | Luo et al. |
| 10,519,906 B2 | 12/2019 | Truax |
| 10,532,654 B2 | 1/2020 | Voice et al. |
| 10,544,031 B2 | 1/2020 | Dudar |
| 10,550,801 B2 | 2/2020 | Dudar |
| 10,590,874 B2 | 3/2020 | Dudar |
| 10,596,899 B2 | 3/2020 | Koch |
| 10,598,107 B2 | 3/2020 | Asanuma et al. |
| 10,611,625 B2 | 4/2020 | Dudar |
| 10,626,830 B2 | 4/2020 | Dudar |
| 10,718,278 B2 | 7/2020 | Nishimura et al. |
| 10,746,111 B1 | 8/2020 | Dudar |
| 10,753,294 B2 | 8/2020 | Dudar |
| 10,766,758 B2 | 9/2020 | Blyth |
| 10,792,997 B2 | 10/2020 | Bosch et al. |
| 10,792,998 B2 | 10/2020 | Ramirez Macias et al. |
| 10,794,320 B2 | 10/2020 | Russ et al. |
| 10,836,248 B2 | 11/2020 | Song et al. |
| 10,837,374 B2 | 11/2020 | Zimmer et al. |
| 10,900,427 B2 | 1/2021 | Dudar |
| 10,906,393 B2 | 2/2021 | Cinar et al. |
| 10,907,586 B2 | 2/2021 | Rowley |
| 10,940,984 B2 | 3/2021 | Ponticelli, Sr. et al. |
| 10,961,937 B2 | 3/2021 | Dudar |
| 10,967,721 B2 | 4/2021 | Mercier et al. |
| 10,981,774 B2 | 4/2021 | Dudar |
| 10,994,605 B2 | 5/2021 | Dudar |
| 11,014,441 B2 | 5/2021 | Costa et al. |
| 11,034,234 B2 | 6/2021 | Dudar |
| 11,046,176 B2 | 6/2021 | Danielson et al. |
| 11,047,321 B2 | 6/2021 | Dudar |
| 11,060,491 B2 | 7/2021 | Nishimura et al. |
| 11,072,251 B2 | 7/2021 | Dudar |
| 11,091,364 B2 | 8/2021 | Yang et al. |
| 11,097,940 B2 | 8/2021 | Dudar et al. |
| 11,104,222 B2 | 8/2021 | Dudar |
| 11,104,322 B2 | 8/2021 | Dudar |
| 11,105,278 B2 | 8/2021 | Atterberry et al. |
| 2002/0011490 A1 | 1/2002 | Nakamura et al. |
| 2002/0025742 A1 | 2/2002 | Berthiaume et al. |
| 2002/0066734 A1* | 6/2002 | Harris .............. B60K 15/0406 220/304 |
| 2002/0096519 A1 | 7/2002 | Joost et al. |
| 2002/0100168 A1* | 8/2002 | Yoshida ................ B60K 15/04 29/890.14 |
| 2002/0162816 A1* | 11/2002 | Walsh ...................... A61J 11/04 215/276 |
| 2002/0175165 A1 | 11/2002 | Jones |
| 2003/0094455 A1 | 5/2003 | Pozgainer et al. |
| 2003/0234004 A1 | 12/2003 | Forgue et al. |
| 2003/0234254 A1 | 12/2003 | Grybush et al. |
| 2004/0074556 A1* | 4/2004 | O'Connell ............. B60K 15/04 141/1 |
| 2004/0094554 A1 | 5/2004 | Grybush et al. |
| 2004/0139944 A1 | 7/2004 | Nakano et al. |
| 2004/0149759 A1 | 8/2004 | Moser et al. |
| 2004/0157020 A1 | 8/2004 | Nakamura et al. |
| 2004/0178086 A1* | 9/2004 | Sawaguchi ............ B65D 51/24 206/217 |
| 2004/0219414 A1 | 11/2004 | Ozeki |
| 2005/0045399 A1 | 3/2005 | Kudo et al. |
| 2005/0252489 A1 | 11/2005 | Moody |
| 2005/0274725 A1 | 12/2005 | Wood |
| 2006/0086404 A1* | 4/2006 | Wu ........................ B62J 37/00 141/59 |
| 2006/0096161 A1 | 5/2006 | Connor et al. |
| 2006/0151420 A1* | 7/2006 | Espenschied ............ A61J 11/04 215/276 |
| 2006/0180241 A1 | 8/2006 | McClung |
| 2007/0017918 A1 | 1/2007 | Kirk et al. |
| 2007/0079814 A1 | 4/2007 | Rado et al. |
| 2007/0079898 A1* | 4/2007 | Grover ................... B67C 11/02 141/340 |
| 2007/0108211 A1 | 5/2007 | Zhu |
| 2007/0125784 A1 | 6/2007 | Bisceglia et al. |
| 2008/0006252 A1 | 1/2008 | Kramer |
| 2008/0006333 A1 | 1/2008 | Partridge et al. |
| 2008/0022982 A1 | 1/2008 | Kamiyama |
| 2008/0053413 A1 | 3/2008 | Donahue et al. |
| 2009/0050625 A1 | 2/2009 | Fowler |
| 2009/0107582 A1* | 4/2009 | Sayage .................. B65D 51/24 141/340 |
| 2009/0145516 A1 | 6/2009 | Wells et al. |
| 2009/0145903 A1 | 6/2009 | Soltis et al. |
| 2009/0188479 A1 | 7/2009 | Haudel |
| 2009/0194081 A1 | 8/2009 | Ito et al. |
| 2009/0272746 A1 | 11/2009 | Keller |
| 2009/0315729 A1 | 12/2009 | Inhoffer |
| 2010/0063708 A1 | 3/2010 | Dotzer et al. |
| 2010/0090138 A1 | 4/2010 | Bromley |
| 2010/0147392 A1 | 6/2010 | Craddock |
| 2010/0198481 A1 | 8/2010 | Bromberg et al. |
| 2010/0206873 A1 | 8/2010 | Lamprecht |
| 2011/0011369 A1 | 1/2011 | Jaasma et al. |
| 2011/0036065 A1 | 2/2011 | Wong et al. |
| 2011/0071721 A1 | 3/2011 | Gilfillan et al. |
| 2011/0091824 A1 | 4/2011 | Barve et al. |
| 2011/0155102 A1 | 6/2011 | Ten Broeke |
| 2011/0315682 A1 | 12/2011 | Tsiberidis |
| 2012/0110966 A1 | 5/2012 | Wong et al. |
| 2012/0222473 A1 | 9/2012 | Kita et al. |
| 2012/0291876 A1 | 11/2012 | Bonner |
| 2012/0298213 A1* | 11/2012 | Forster ............... B60K 15/0403 137/215 |
| 2013/0014730 A1 | 1/2013 | Shmura et al. |
| 2013/0074936 A1 | 3/2013 | Merchant et al. |
| 2013/0118449 A1 | 5/2013 | Marriott et al. |
| 2013/0240536 A1* | 9/2013 | Feichtinger ............ B60K 15/04 29/888.01 |
| 2013/0256305 A1 | 10/2013 | Schuller et al. |
| 2013/0312690 A1 | 11/2013 | Ferrie |
| 2013/0319572 A1 | 12/2013 | Zweifel |
| 2014/0103642 A1 | 4/2014 | Boecker et al. |
| 2014/0202430 A1 | 7/2014 | Monros |
| 2014/0346170 A1 | 11/2014 | Voss, III |
| 2015/0027385 A1 | 1/2015 | Von Der Osten-Sack et al. |
| 2015/0040849 A1 | 2/2015 | Von Der Osten-Sack et al. |
| 2015/0114370 A1 | 4/2015 | Leone et al. |
| 2015/0128919 A1 | 5/2015 | Ibrahim |
| 2015/0198109 A1 | 7/2015 | Truax |
| 2015/0285164 A1 | 10/2015 | Gluschke et al. |

(56) References Cited

U.S. PATENT DOCUMENTS

| | | | |
|---|---|---|---|
| 2015/0291408 A1* | 10/2015 | Fox | B60K 15/04 141/1 |
| 2015/0322904 A1 | 11/2015 | Leone et al. | |
| 2015/0343898 A1* | 12/2015 | Kito | B60K 15/04 220/86.1 |
| 2015/0375615 A1* | 12/2015 | Brown | B60K 15/0406 220/86.1 |
| 2016/0046183 A1 | 2/2016 | Hill et al. | |
| 2016/0053694 A1 | 2/2016 | Woo et al. | |
| 2016/0123286 A1 | 5/2016 | Hou | |
| 2016/0169133 A1 | 6/2016 | Yeager et al. | |
| 2016/0252052 A1 | 9/2016 | Gartzke et al. | |
| 2016/0377005 A1 | 12/2016 | Dudar et al. | |
| 2017/0022859 A1 | 1/2017 | Schmalz | |
| 2017/0240415 A1 | 8/2017 | McKenzie et al. | |
| 2017/0335761 A1 | 11/2017 | Horsley et al. | |
| 2018/0148311 A1 | 5/2018 | Zweifel | |
| 2018/0170175 A1 | 6/2018 | Schroder | |
| 2018/0281587 A1 | 10/2018 | Jiang et al. | |
| 2019/0016211 A1 | 1/2019 | Novak | |
| 2019/0024616 A1 | 1/2019 | Monros | |
| 2019/0143773 A1 | 5/2019 | Thompson et al. | |
| 2019/0152313 A1* | 5/2019 | Koch | B60K 15/03504 |
| 2019/0309694 A1 | 10/2019 | Schroeder et al. | |
| 2019/0357711 A1* | 11/2019 | Nichols | B65D 53/02 |
| 2020/0001704 A1 | 1/2020 | Hedevang et al. | |
| 2020/0033175 A1 | 1/2020 | Dixon et al. | |
| 2020/0102203 A1 | 4/2020 | Dudar | |
| 2020/0158030 A1 | 5/2020 | Hitomi et al. | |
| 2020/0247233 A1 | 8/2020 | Auernhammer et al. | |
| 2020/0361313 A1 | 11/2020 | Cragel et al. | |
| 2020/0370516 A1 | 11/2020 | Dudar | |
| 2021/0139313 A1 | 5/2021 | Espinoza | |
| 2021/0278177 A1 | 9/2021 | Clanton et al. | |

FOREIGN PATENT DOCUMENTS

| | | |
|---|---|---|
| AU | 674485 B | 12/1996 |
| AU | 684853 B | 1/1998 |
| AU | 200071909 A | 5/2002 |
| AU | 2002245582 A1 | 10/2003 |
| AU | 781646 B2 | 6/2005 |
| AU | 2002365971 B2 | 7/2006 |
| AU | 2009100806 B4 | 12/2010 |
| AU | 2010246477 A1 | 7/2011 |
| AU | 2009220299 B2 | 12/2013 |
| AU | 2016384575 A1 | 6/2018 |
| AU | 2018329194 A1 | 4/2020 |
| BR | 198807885 A | 11/1990 |
| BR | 199103806 A | 5/1992 |
| BR | 200214276 A | 12/2004 |
| BR | PI0803412 A2 | 6/2009 |
| BR | PI0300951 B1 | 7/2011 |
| BR | PI0713716 A2 | 10/2012 |
| BR | PI0719441 A2 | 2/2013 |
| BR | 102012024157 A2 | 8/2014 |
| BR | 112014000134 A2 | 2/2017 |
| BR | 112015024809 A2 | 7/2017 |
| BR | 102016030934 A2 | 7/2018 |
| BR | 112018011692 A2 | 12/2018 |
| BR | PI0808925 B1 | 2/2019 |
| BR | PI0910739 B1 | 2/2019 |
| BR | PI0909175 A2 | 9/2019 |
| BR | 112019026492 A2 | 7/2020 |
| BR | 112013019370 A2 | 10/2020 |
| BR | 112015000256 B1 | 4/2021 |
| CA | 1040559 A1 | 10/1978 |
| CA | 1068962 A | 1/1980 |
| CA | 1095475 A1 | 2/1981 |
| CA | 1224369 A1 | 7/1987 |
| CA | 2021673 A1 | 1/1991 |
| CA | 1284972 C | 6/1991 |
| CA | 2100243 A1 | 7/1992 |
| CA | 1316843 C | 4/1993 |
| CA | 1319646 C | 6/1993 |
| CA | 2167002 A1 | 7/1996 |
| CA | 2246766 A1 | 8/1997 |
| CA | 2087943 C | 4/1998 |
| CA | 2280160 A1 | 8/1998 |
| CA | 2195230 C | 5/1999 |
| CA | 2309095 A1 | 5/1999 |
| CA | 2174975 C | 10/1999 |
| CA | 2172290 C | 1/2000 |
| CA | 2218952 C | 4/2001 |
| CA | 2445812 A1 | 11/2002 |
| CA | 2547291 A1 | 3/2004 |
| CA | 2328269 C | 8/2004 |
| CA | 2325099 C | 3/2005 |
| CA | 2507962 A1 | 12/2005 |
| CA | 2372422 C | 10/2006 |
| CA | 2440565 C | 1/2007 |
| CA | 2540943 A1 | 1/2007 |
| CA | 2593337 A1 | 1/2008 |
| CA | 2536860 C | 12/2008 |
| CA | 2406292 C | 9/2009 |
| CA | 2717164 A1 | 9/2009 |
| CA | 2759894 A1 | 8/2010 |
| CA | 2394457 C | 1/2011 |
| CA | 2742011 C | 7/2012 |
| CA | 2594995 C | 12/2012 |
| CA | 2780864 C | 9/2013 |
| CA | 2864602 A1 | 9/2013 |
| CA | 2864662 A1 | 9/2013 |
| CA | 3097024 A1 | 4/2014 |
| CA | 2834055 A1 | 5/2014 |
| CA | 2903161 A1 | 9/2014 |
| CA | 2964825 A1 | 4/2016 |
| CA | 2834047 C | 7/2016 |
| CA | 2834044 C | 10/2016 |
| CA | 2717149 C | 4/2017 |
| CA | 2894801 C | 5/2017 |
| CA | 2729413 C | 8/2017 |
| CA | 2952476 A1 | 6/2018 |
| CA | 3068150 A1 | 1/2019 |
| CA | 3003854 A1 | 9/2019 |
| CA | 2945802 C | 6/2020 |
| CA | 3010694 C | 11/2020 |
| CA | 2888097 C | 12/2020 |
| CH | 633612 A5 | 12/1982 |
| CH | 647847 A5 | 2/1985 |
| CH | 680159 A5 | 6/1992 |
| CN | 1130741 A | 9/1996 |
| CN | 1151199 A | 6/1997 |
| CN | 1066242 C | 5/2001 |
| CN | 1517541 A | 8/2004 |
| CN | 1703796 A | 11/2005 |
| CN | 1312393 C | 4/2007 |
| CN | 200961521 Y | 10/2007 |
| CN | 101517214 A | 8/2009 |
| CN | 201334970 Y | 10/2009 |
| CN | 101586497 A | 11/2009 |
| CN | 101586498 A | 11/2009 |
| CN | 101825334 A | 9/2010 |
| CN | 101180462 B | 3/2011 |
| CN | 1589311 B | 11/2011 |
| CN | 102374043 A | 3/2012 |
| CN | 102383948 A | 3/2012 |
| CN | 202200835 U | 4/2012 |
| CN | 1975134 B | 6/2012 |
| CN | 102700405 A | 10/2012 |
| CN | 202611871 U | 12/2012 |
| CN | 102878047 A | 1/2013 |
| CN | 202659358 U | 1/2013 |
| CN | 202811148 U | 3/2013 |
| CN | 202926477 U | 5/2013 |
| CN | 203022939 U | 6/2013 |
| CN | 103192697 A | 7/2013 |
| CN | 101539063 B | 8/2013 |
| CN | 103328789 A | 9/2013 |
| CN | 103403329 A | 11/2013 |
| CN | 102016275 B | 12/2013 |
| CN | 203584587 U | 5/2014 |
| CN | 103867364 A | 6/2014 |

(56) References Cited

FOREIGN PATENT DOCUMENTS

| | | |
|---|---|---|
| CN | 101571087 B | 8/2014 |
| CN | 103987944 A | 8/2014 |
| CN | 102575853 B | 9/2014 |
| CN | 104033311 A | 9/2014 |
| CN | 102007287 B | 12/2014 |
| CN | 204239108 U | 4/2015 |
| CN | 101886579 B | 5/2015 |
| CN | 104696040 A | 6/2015 |
| CN | 104696118 A | 6/2015 |
| CN | 102859151 B | 7/2015 |
| CN | 104963778 A | 10/2015 |
| CN | 105089838 A | 11/2015 |
| CN | 103415687 B | 12/2015 |
| CN | 204822518 U | 12/2015 |
| CN | 102261284 B | 2/2016 |
| CN | 105697160 A | 6/2016 |
| CN | 205330807 U | 6/2016 |
| CN | 105804890 A | 7/2016 |
| CN | 102213153 B | 8/2016 |
| CN | 102840070 B | 8/2016 |
| CN | 103104356 B | 8/2016 |
| CN | 105927377 A | 9/2016 |
| CN | 103061904 B | 12/2016 |
| CN | 106246358 A | 12/2016 |
| CN | 106438073 A | 2/2017 |
| CN | 106467017 A | 3/2017 |
| CN | 102278214 B | 4/2017 |
| CN | 103890346 B | 4/2017 |
| CN | 106677910 A | 5/2017 |
| CN | 104136748 B | 8/2017 |
| CN | 107208560 A | 9/2017 |
| CN | 206503661 U | 9/2017 |
| CN | 107630760 A | 1/2018 |
| CN | 104369672 B | 7/2018 |
| CN | 105121818 B | 7/2018 |
| CN | 108488015 A | 9/2018 |
| CN | 108884790 A | 11/2018 |
| CN | 105317599 B | 2/2019 |
| CN | 105041540 B | 3/2019 |
| CN | 109538385 A | 3/2019 |
| CN | 104775920 B | 5/2019 |
| CN | 109790785 A | 5/2019 |
| CN | 110168790 A | 8/2019 |
| CN | 209312201 U | 8/2019 |
| CN | 105649838 B | 9/2019 |
| CN | 107499115 B | 9/2019 |
| CN | 105804906 B | 11/2019 |
| CN | 110709597 A | 1/2020 |
| CN | 104564370 B | 2/2020 |
| CN | 110792530 A | 2/2020 |
| CN | 109281787 B | 3/2020 |
| CN | 110872990 A | 3/2020 |
| CN | 105089826 B | 4/2020 |
| CN | 106286061 8 | 4/2020 |
| CN | 110043362 B | 7/2020 |
| CN | 110312630 B | 7/2020 |
| CN | 210919302 U | 7/2020 |
| CN | 211008892 U | 7/2020 |
| CN | 105736166 B | 8/2020 |
| CN | 106286051 B | 9/2020 |
| CN | 111634367 A | 9/2020 |
| CN | 108368783 B | 1/2021 |
| CN | 112177762 A | 1/2021 |
| CN | 107949690 B | 2/2021 |
| CN | 108026844 B | 2/2021 |
| CN | 112334646 A | 2/2021 |
| CN | 105697174 B | 4/2021 |
| CN | 108474313 B | 4/2021 |
| CN | 109416005 B | 5/2021 |
| CN | 112840115 A | 5/2021 |
| CN | 112855360 A | 5/2021 |
| CN | 112855361 A | 5/2021 |
| CN | 113027594 A | 6/2021 |
| CN | 108474304 B | 7/2021 |
| CN | 213743764 U | 7/2021 |
| CN | 113236446 A | 8/2021 |
| DE | 3702456 A1 | 8/1988 |
| DE | 3830883 A1 | 3/1990 |
| DE | 4136305 A1 | 5/1993 |
| DE | 4417167 A1 | 11/1995 |
| DE | 69405400 | 10/1997 |
| DE | 59700861 | 1/2000 |
| DE | 19922748 C2 | 5/2001 |
| DE | 10042698 A1 | 3/2002 |
| DE | 10146051 A1 | 10/2002 |
| DE | 10248228 A1 | 4/2003 |
| DE | 10216246 A1 | 10/2003 |
| DE | 10252225 A1 | 5/2004 |
| DE | 4027948 B4 | 6/2005 |
| DE | 102004016160 A1 | 10/2005 |
| DE | 60024762 | 1/2006 |
| DE | 202004020597 U1 | 1/2006 |
| DE | 60024762 T2 | 7/2006 |
| DE | 202005008327 U1 | 10/2006 |
| DE | 102004050601 B4 | 12/2006 |
| DE | 102006031052 A1 | 1/2008 |
| DE | 102006034017 A1 | 1/2008 |
| DE | 102006008902 B4 | 5/2008 |
| DE | 102007020702 A1 | 11/2008 |
| DE | 60229910 | 1/2009 |
| DE | 102007030798 A1 | 1/2009 |
| DE | 102007034189 A1 | 1/2009 |
| DE | 60230540 | 2/2009 |
| DE | 19600693 B4 | 3/2009 |
| DE | 102007050305 A1 | 4/2009 |
| DE | 102008013163 A1 | 9/2009 |
| DE | 102006018736 B4 | 10/2009 |
| DE | 102009009481 A1 | 10/2009 |
| DE | 102008027462 A1 | 12/2009 |
| DE | 102008049498 A1 | 4/2010 |
| DE | 102004050602 B4 | 5/2010 |
| DE | 102008043930 A1 | 6/2010 |
| DE | 102010017920 A1 | 11/2010 |
| DE | 102011076031 A1 | 12/2011 |
| DE | 102011076065 A1 | 12/2011 |
| DE | 102010036131 A1 | 3/2012 |
| DE | 102010045517 A1 | 3/2012 |
| DE | 102010045520 A1 | 3/2012 |
| DE | 102011013691 A1 | 9/2012 |
| DE | 102010035722 B4 | 12/2012 |
| DE | 102010061220 B3 | 2/2013 |
| DE | 102012217664 A1 | 4/2013 |
| DE | 102011088795 A1 | 6/2013 |
| DE | 102008006841 B4 | 7/2013 |
| DE | 102008020928 B4 | 4/2014 |
| DE | 102009037489 B4 | 7/2014 |
| DE | 202014105024 U1 | 12/2014 |
| DE | 102014216133 A1 | 2/2015 |
| DE | 102014216481 A1 | 2/2015 |
| DE | 112011101476 B4 | 2/2015 |
| DE | 102014012080 A1 | 3/2015 |
| DE | 102013016460 A1 | 4/2015 |
| DE | 102014221442 A1 | 4/2015 |
| DE | 102014221918 A1 | 6/2015 |
| DE | 102014224796 A1 | 6/2015 |
| DE | 102015206740 A1 | 10/2015 |
| DE | 102015208169 A1 | 11/2015 |
| DE | 102014224149 A1 | 6/2016 |
| DE | 102015122104 A1 | 6/2016 |
| DE | 102016109984 A1 | 12/2016 |
| DE | 102015014402 A1 | 5/2017 |
| DE | 102016219152 A1 | 4/2018 |
| DE | 112011101688 B4 | 4/2018 |
| DE | 102017202151 A1 | 8/2018 |
| DE | 102017214098 A1 | 11/2018 |
| DE | 102008023306 B4 | 5/2019 |
| DE | 102008041406 B4 | 7/2019 |
| DE | 102018108097 A1 | 10/2019 |
| DE | 102018214856 A1 | 3/2020 |
| DE | 102012220168 B4 | 4/2020 |
| DK | 167707 B1 | 12/1993 |
| EA | 32885 B1 | 7/2019 |
| EP | 55417 A2 | 7/1982 |
| EP | 140170 A2 | 5/1985 |

(56) References Cited

FOREIGN PATENT DOCUMENTS

| | | | |
|---|---|---|---|
| EP | 382896 | B1 | 12/1992 |
| EP | 280199 | B1 | 8/1995 |
| EP | 718484 | A2 | 6/1996 |
| EP | 723073 | A2 | 7/1996 |
| EP | 770173 | A1 | 5/1997 |
| EP | 704611 | B1 | 9/1997 |
| EP | 720690 | B1 | 9/1997 |
| EP | 660793 | B1 | 12/1997 |
| EP | 845102 | A2 | 6/1998 |
| EP | 863038 | A2 | 9/1998 |
| EP | 714800 | B1 | 5/1999 |
| EP | 933518 | A2 | 8/1999 |
| EP | 915054 | B1 | 12/1999 |
| EP | 970005 | A1 | 1/2000 |
| EP | 1027585 | A1 | 8/2000 |
| EP | 1061038 | A1 | 12/2000 |
| EP | 1071875 | A2 | 1/2001 |
| EP | 1091885 | A1 | 4/2001 |
| EP | 785357 | B1 | 5/2001 |
| EP | 1097832 | A2 | 5/2001 |
| EP | 755348 | B1 | 6/2001 |
| EP | 820402 | B1 | 2/2002 |
| EP | 926199 | B1 | 8/2002 |
| EP | 1077824 | B1 | 11/2002 |
| EP | 1258625 | A2 | 11/2002 |
| EP | 1278954 | A1 | 1/2003 |
| EP | 1281850 | A2 | 2/2003 |
| EP | 882096 | B1 | 5/2003 |
| EP | 1346152 | A2 | 9/2003 |
| EP | 1373698 | A1 | 1/2004 |
| EP | 1400686 | A1 | 3/2004 |
| EP | 1416150 | A3 | 6/2004 |
| EP | 1496247 | A1 | 1/2005 |
| EP | 1502794 | A2 | 2/2005 |
| EP | 1547187 | A2 | 6/2005 |
| EP | 1559900 | A2 | 8/2005 |
| EP | 1108876 | B1 | 12/2005 |
| EP | 1607613 | A2 | 12/2005 |
| EP | 1013922 | B1 | 1/2006 |
| EP | 1086842 | B1 | 3/2006 |
| EP | 1202906 | B1 | 4/2006 |
| EP | 1647685 | A2 | 4/2006 |
| EP | 1363004 | A3 | 8/2006 |
| EP | 1466776 | B1 | 9/2006 |
| EP | 1179445 | B1 | 10/2006 |
| EP | 1745971 | A2 | 1/2007 |
| EP | 1775584 | A2 | 4/2007 |
| EP | 1841962 | A1 | 10/2007 |
| EP | 1637382 | B1 | 11/2007 |
| EP | 1742028 | A3 | 1/2008 |
| EP | 1895145 | A2 | 3/2008 |
| EP | 1988272 | A1 | 11/2008 |
| EP | 1989077 | A1 | 11/2008 |
| EP | 1446463 | B1 | 12/2008 |
| EP | 1304466 | B8 | 2/2009 |
| EP | 1873378 | B1 | 2/2009 |
| EP | 1812704 | B1 | 3/2009 |
| EP | 2034162 | A1 | 3/2009 |
| EP | 2037115 | A1 | 3/2009 |
| EP | 2126326 | A1 | 12/2009 |
| EP | 1693241 | B1 | 1/2010 |
| EP | 2115344 | B1 | 6/2010 |
| EP | 1987976 | B1 | 7/2010 |
| EP | 2208881 | A1 | 7/2010 |
| EP | 2211041 | A1 | 7/2010 |
| EP | 2282040 | A1 | 2/2011 |
| EP | 1985825 | B1 | 4/2011 |
| EP | 2198140 | B1 | 4/2011 |
| EP | 2341234 | A2 | 7/2011 |
| EP | 1883750 | B1 | 12/2011 |
| EP | 2098707 | B1 | 1/2012 |
| EP | 2495542 | A1 | 9/2012 |
| EP | 2426335 | B1 | 5/2013 |
| EP | 2398664 | B1 | 10/2013 |
| EP | 2664771 | A1 | 11/2013 |
| EP | 2729685 | A1 | 5/2014 |
| EP | 2331357 | B1 | 7/2014 |
| EP | 2759437 | A1 | 7/2014 |
| EP | 2820274 | A1 | 1/2015 |
| EP | 2820275 | A1 | 1/2015 |
| EP | 2836555 | A2 | 2/2015 |
| EP | 2836556 | A2 | 2/2015 |
| EP | 2850303 | A1 | 3/2015 |
| EP | 2864622 | A1 | 4/2015 |
| EP | 2724007 | B1 | 5/2015 |
| EP | 2260200 | B1 | 6/2015 |
| EP | 2431597 | B1 | 7/2015 |
| EP | 2491310 | B1 | 7/2015 |
| EP | 2527624 | B1 | 7/2015 |
| EP | 2895720 | A1 | 7/2015 |
| EP | 2962925 | A1 | 1/2016 |
| EP | 2589284 | B1 | 3/2016 |
| EP | 2994329 | A1 | 3/2016 |
| EP | 2578867 | B1 | 10/2016 |
| EP | 2818673 | B1 | 12/2016 |
| EP | 2679788 | A4 | 4/2017 |
| EP | 2853713 | B1 | 4/2017 |
| EP | 2984321 | B1 | 4/2017 |
| EP | 2960093 | B1 | 8/2017 |
| EP | 3209510 | A1 | 8/2017 |
| EP | 3045030 | B1 | 10/2017 |
| EP | 2836552 | B1 | 4/2018 |
| EP | 2964477 | B1 | 6/2018 |
| EP | 2906460 | B1 | 7/2018 |
| EP | 3381791 | A1 | 10/2018 |
| EP | 3388313 | A1 | 10/2018 |
| EP | 3400379 | A1 | 11/2018 |
| EP | 2049434 | B1 | 3/2019 |
| EP | 3168445 | B1 | 5/2019 |
| EP | 3486474 | A1 | 5/2019 |
| EP | 2981427 | B1 | 6/2019 |
| EP | 3009292 | B1 | 6/2019 |
| EP | 2049433 | B1 | 9/2019 |
| EP | 3550128 | A1 | 10/2019 |
| EP | 3078792 | B1 | 2/2020 |
| EP | 3394411 | B1 | 2/2020 |
| EP | 3397849 | B1 | 3/2020 |
| EP | 3177537 | B1 | 6/2020 |
| EP | 3685029 | A1 | 7/2020 |
| EP | 3702287 | A1 | 9/2020 |
| EP | 3436331 | B1 | 2/2021 |
| EP | 3776503 | A2 | 2/2021 |
| EP | 3580081 | B1 | 3/2021 |
| EP | 3261870 | B1 | 4/2021 |
| EP | 3372433 | B1 | 5/2021 |
| EP | 3867516 | A1 | 8/2021 |
| ES | 2107291 | T3 | 11/1997 |
| ES | 2141566 | T3 | 3/2000 |
| ES | 2254054 | T3 | 6/2006 |
| ES | 2544758 | T3 | 9/2015 |
| FR | 2668203 | A1 | 4/1992 |
| FR | 2777605 | A1 | 10/1999 |
| FR | 2796931 | A1 | 2/2001 |
| FR | 2971009 | B1 | 3/2013 |
| FR | 3091314 | A1 | 7/2020 |
| FR | 3094760 | A1 | 10/2020 |
| FR | 3105427 | A1 | 6/2021 |
| GB | 2245259 | A | 1/1992 |
| GB | 2387621 | B | 9/2004 |
| GB | 2455620 | A | 6/2009 |
| GB | 2456178 | A | 7/2009 |
| GB | 2558944 | A | 7/2018 |
| HK | 40012054 | A | 7/2020 |
| IN | 6147/DELNP/2005 | P1 | 9/2007 |
| IN | 6148/DELNP/2005 | P1 | 9/2007 |
| IN | 6149/DELNP/2005 | P1 | 9/2007 |
| IN | 1485/MUM/2008 | A | 9/2008 |
| IN | 224055 | B | 2/2009 |
| IN | 2118/DEL/2005 | I1 | 7/2009 |
| IN | 240664 | B | 5/2010 |
| IN | 4051/MUM/2013 | I3 | 7/2015 |
| IN | 1565/DEL/2012 | I1 | 12/2015 |
| IN | 1019/KOLNP/2010 | P2 | 8/2016 |
| IN | 319540 | B | 9/2019 |

(56) References Cited

FOREIGN PATENT DOCUMENTS

| | | |
|---|---|---|
| IN | 329820 B | 1/2020 |
| IN | 201841039371 A | 4/2020 |
| IN | 337513 B | 6/2020 |
| IT | 1285150 B1 | 6/1998 |
| JP | 57087715 A | 6/1982 |
| JP | 57110737 A | 7/1982 |
| JP | 58065945 A | 4/1983 |
| JP | 58122352 A | 7/1983 |
| JP | 62035054 A | 2/1987 |
| JP | H0518935 U | 3/1993 |
| JP | H0589058 U | 12/1993 |
| JP | 6159202 A | 6/1994 |
| JP | 9505653 A | 6/1997 |
| JP | H10504365 A | 4/1998 |
| JP | H11166432 A | 6/1999 |
| JP | 2000265183 A | 9/2000 |
| JP | 2001055931 A | 2/2001 |
| JP | 03156218 B2 | 4/2001 |
| JP | 03242425 B2 | 12/2001 |
| JP | 2003056425 A | 2/2003 |
| JP | 3092962 U | 4/2003 |
| JP | 2003120352 A | 4/2003 |
| JP | 2003193915 A | 7/2003 |
| JP | 03446364 B2 | 9/2003 |
| JP | 03497254 B2 | 2/2004 |
| JP | 03500693 B2 | 2/2004 |
| JP | 2004036458 A | 2/2004 |
| JP | 2004211610 A | 7/2004 |
| JP | 2004522039 A | 7/2004 |
| JP | 03607980 B2 | 1/2005 |
| JP | 2005509729 A | 4/2005 |
| JP | 03743466 B2 | 2/2006 |
| JP | 2006183468 A | 7/2006 |
| JP | 03956953 B2 | 8/2007 |
| JP | 2007239600 A | 9/2007 |
| JP | 2007285121 A | 11/2007 |
| JP | 2007315357 A | 12/2007 |
| JP | 2007315358 A | 12/2007 |
| JP | 2008002328 A | 1/2008 |
| JP | 2008002405 A | 1/2008 |
| JP | 2008008278 A | 1/2008 |
| JP | 2008051060 A | 3/2008 |
| JP | 2008075511 A | 4/2008 |
| JP | 2008075566 A | 4/2008 |
| JP | 2008115710 A | 5/2008 |
| JP | 2008121641 A | 5/2008 |
| JP | 04126798 B2 | 7/2008 |
| JP | 2008159363 A | 7/2008 |
| JP | 2008232030 A | 10/2008 |
| JP | 2008267324 A | 11/2008 |
| JP | 04214586 B2 | 1/2009 |
| JP | 2009019867 A | 1/2009 |
| JP | 2009046991 A | 3/2009 |
| JP | 2009138580 A | 6/2009 |
| JP | 2009191734 A | 8/2009 |
| JP | 04325511 B2 | 9/2009 |
| JP | 04327183 B2 | 9/2009 |
| JP | 2009203909 A | 9/2009 |
| JP | 2009276091 A | 11/2009 |
| JP | 2009299625 A | 12/2009 |
| JP | 04434652 B2 | 3/2010 |
| JP | 04466340 B2 | 5/2010 |
| JP | 04466616 B2 | 5/2010 |
| JP | 2010111255 A | 5/2010 |
| JP | 04498384 B2 | 7/2010 |
| JP | 04535051 B2 | 9/2010 |
| JP | 04539503 B2 | 9/2010 |
| JP | 2010540815 A | 12/2010 |
| JP | 2011027001 A | 2/2011 |
| JP | 04784943 B2 | 10/2011 |
| JP | 04798304 B2 | 10/2011 |
| JP | 04807338 B2 | 11/2011 |
| JP | 04835421 B2 | 12/2011 |
| JP | 2011241758 A | 12/2011 |
| JP | 04871972 B2 | 2/2012 |
| JP | 04872969 B2 | 2/2012 |
| JP | 04889669 B2 | 3/2012 |
| JP | 04907592 B2 | 3/2012 |
| JP | 04907593 B2 | 3/2012 |
| JP | 2012047127 A | 3/2012 |
| JP | 2012057471 A | 3/2012 |
| JP | 04937287 B2 | 5/2012 |
| JP | 05118839 B2 | 1/2013 |
| JP | 05131396 B2 | 1/2013 |
| JP | 2013023043 A | 2/2013 |
| JP | 05223969 B2 | 6/2013 |
| JP | 05235089 B2 | 7/2013 |
| JP | 05253335 B2 | 7/2013 |
| JP | 2013151867 A | 8/2013 |
| JP | 05292205 B2 | 9/2013 |
| JP | 05319018 B2 | 10/2013 |
| JP | 05634601 B2 | 12/2014 |
| JP | 05646738 B2 | 12/2014 |
| JP | 2014224472 A | 12/2014 |
| JP | 05671348 B2 | 2/2015 |
| JP | 05673411 B2 | 2/2015 |
| JP | 2015039935 A | 3/2015 |
| JP | 2015068338 A | 4/2015 |
| JP | 05729381 B2 | 6/2015 |
| JP | 2015120386 A | 7/2015 |
| JP | 2015127529 A | 7/2015 |
| JP | 2015151838 A | 8/2015 |
| JP | 05867372 B2 | 2/2016 |
| JP | 5954138 B2 | 7/2016 |
| JP | 06047798 B2 | 12/2016 |
| JP | 2016205453 A | 12/2016 |
| JP | 06058061 B2 | 1/2017 |
| JP | 06220443 B2 | 10/2017 |
| JP | 06286443 B2 | 2/2018 |
| JP | 2018040331 A | 3/2018 |
| JP | 06326859 B2 | 5/2018 |
| JP | 06446180 B2 | 12/2018 |
| JP | 2019014275 A | 1/2019 |
| JP | 2019048553 A | 3/2019 |
| JP | 06591336 B2 | 10/2019 |
| JP | 2020007924 A | 1/2020 |
| JP | 06679435 B2 | 4/2020 |
| JP | 06692999 B2 | 5/2020 |
| JP | 2020186694 A | 11/2020 |
| JP | 2020531725 A | 11/2020 |
| JP | 06818756 B2 | 1/2021 |
| KR | 19980041587 U | 9/1998 |
| KR | 20000044093 A | 7/2000 |
| KR | 100427940 B1 | 4/2004 |
| KR | 100471999 B1 | 3/2005 |
| KR | 20090029626 A | 3/2009 |
| KR | 20090105578 A | 10/2009 |
| KR | 1148683 B1 | 5/2012 |
| KR | 1394080 B1 | 5/2014 |
| KR | 1513960 B1 | 4/2015 |
| KR | 1551163 B1 | 9/2015 |
| KR | 1557904 B1 | 10/2015 |
| KR | 101558617 B1 | 10/2015 |
| KR | 20150139860 A | 12/2015 |
| KR | 1694263 B1 | 1/2017 |
| KR | 1745005 B1 | 6/2017 |
| KR | 20180076938 A | 7/2018 |
| KR | 1920511 B1 | 11/2018 |
| KR | 1927565 B1 | 12/2018 |
| KR | 2019018363 A | 2/2019 |
| KR | 2019033152 A | 3/2019 |
| KR | 2018999 B1 | 9/2019 |
| KR | 2019125705 A | 11/2019 |
| KR | 2042887 B1 | 12/2019 |
| KR | 2058584 B1 | 12/2019 |
| KR | 2020030503 A | 3/2020 |
| KR | 2106375 B1 | 5/2020 |
| KR | 2020123433 A | 10/2020 |
| KR | 2215905 B1 | 2/2021 |
| MX | 2004004746 A | 8/2004 |
| MX | 261751 B | 10/2008 |
| MX | 294700 B | 1/2012 |
| MX | 2014009730 A | 2/2015 |
| MX | 2018006854 A | 8/2018 |

(56) References Cited

FOREIGN PATENT DOCUMENTS

| | | |
|---|---|---|
| NL | 2001345 C2 | 9/2009 |
| NZ | 275898 A | 5/1997 |
| RU | 2006621 C1 | 1/1994 |
| RU | 2046041 C1 | 10/1995 |
| RU | 2109162 C1 | 4/1998 |
| RU | 2140556 C1 | 10/1999 |
| RU | 2141050 C1 | 11/1999 |
| RU | 2166436 C2 | 5/2001 |
| RU | 2305791 C1 | 9/2007 |
| RU | 2313688 C1 | 12/2007 |
| RU | 2008138574 A | 4/2010 |
| RU | 2439352 C2 | 1/2012 |
| RU | 2443887 C1 | 2/2012 |
| RU | 2493417 C2 | 9/2013 |
| RU | 2537650 C2 | 1/2015 |
| RU | 153010 U1 | 6/2015 |
| RU | 155543 U1 | 10/2015 |
| RU | 2613769 C2 | 3/2017 |
| RU | 2625886 C2 | 7/2017 |
| RU | 2638491 C2 | 12/2017 |
| RU | 2641795 C2 | 1/2018 |
| RU | 2643569 C2 | 2/2018 |
| RU | 178330 U1 | 3/2018 |
| RU | 2653642 C2 | 5/2018 |
| RU | 2653644 C2 | 5/2018 |
| RU | 2653718 C2 | 5/2018 |
| RU | 180762 U1 | 6/2018 |
| RU | 2660738 C2 | 7/2018 |
| RU | 2666032 C2 | 9/2018 |
| RU | 2680449 C2 | 2/2019 |
| RU | 2682465 C1 | 3/2019 |
| RU | 2684047 C2 | 4/2019 |
| RU | 2690309 C2 | 5/2019 |
| RU | 2695088 C1 | 7/2019 |
| RU | 2710450 C2 | 12/2019 |
| RU | 2719504 C2 | 4/2020 |
| RU | 2722660 C1 | 6/2020 |
| SE | 520920 C2 | 9/2003 |
| SE | 534009 C2 | 3/2011 |
| SG | 11201805842 | 8/2018 |
| SU | 566950 A1 | 8/1977 |
| SU | 1530801 A1 | 12/1989 |
| SU | 1673744 A1 | 8/1991 |
| SU | 1746035 A1 | 7/1992 |
| TH | 137405 A | 10/2014 |
| TH | 157018 A | 10/2016 |
| TW | 289784 B | 11/1996 |
| TW | 200407498 A | 5/2004 |
| TW | 228571 B | 3/2005 |
| WO | 1995004876 A1 | 2/1995 |
| WO | 1995008706 A1 | 3/1995 |
| WO | 1995035442 A1 | 12/1995 |
| WO | 1997030123 A1 | 8/1997 |
| WO | 2001083977 A1 | 11/2001 |
| WO | 2002044556 A2 | 6/2002 |
| WO | 2003083280 A1 | 10/2003 |
| WO | 2003044133 A3 | 3/2004 |
| WO | 2004090309 A1 | 10/2004 |
| WO | 2004032269 A3 | 3/2005 |
| WO | 2006054677 A1 | 5/2006 |
| WO | 2006078079 A1 | 7/2006 |
| WO | 2006126341 A3 | 2/2007 |
| WO | 2006041867 A3 | 3/2007 |
| WO | 2007098900 A1 | 9/2007 |
| WO | 2007106416 A2 | 9/2007 |
| WO | 2007148563 A1 | 12/2007 |
| WO | 2008038440 A1 | 4/2008 |
| WO | 2008038977 A1 | 4/2008 |
| WO | 2008046486 A1 | 4/2008 |
| WO | 2009037489 A2 | 3/2009 |
| WO | 2009053160 A3 | 6/2009 |
| WO | 2009094996 A2 | 8/2009 |
| WO | 2009110792 A1 | 9/2009 |
| WO | 2009130095 A1 | 10/2009 |
| WO | 2010077140 A1 | 7/2010 |
| WO | 2010106635 A1 | 9/2010 |
| WO | 2010136477 A1 | 12/2010 |
| WO | WO11048035 A1 | 4/2011 |
| WO | 2011061851 A1 | 5/2011 |
| WO | 2011136005 A1 | 11/2011 |
| WO | 2011145603 A1 | 11/2011 |
| WO | 2011155670 A1 | 12/2011 |
| WO | 2012002620 A1 | 1/2012 |
| WO | 2012059226 A1 | 5/2012 |
| WO | 2012100916 A1 | 8/2012 |
| WO | 2012136208 A1 | 10/2012 |
| WO | 2012162811 A1 | 12/2012 |
| WO | 2012177128 A1 | 12/2012 |
| WO | 2013003889 A1 | 1/2013 |
| WO | 2013087263 A1 | 6/2013 |
| WO | 2013115645 A1 | 8/2013 |
| WO | 2013127415 A1 | 9/2013 |
| WO | 2013127526 A1 | 9/2013 |
| WO | 2013170951 A1 | 11/2013 |
| WO | 2013188247 A1 | 12/2013 |
| WO | 2013188970 A1 | 12/2013 |
| WO | 2014060071 A1 | 4/2014 |
| WO | 2014135969 A1 | 9/2014 |
| WO | 2014166653 A1 | 10/2014 |
| WO | 2015076416 A1 | 5/2015 |
| WO | 2015079898 A1 | 6/2015 |
| WO | 2015109383 A1 | 7/2015 |
| WO | 2015122418 A1 | 8/2015 |
| WO | 2016074091 A1 | 5/2016 |
| WO | 2016114782 A1 | 7/2016 |
| WO | 2017109269 A1 | 6/2017 |
| WO | 2017115228 A1 | 7/2017 |
| WO | 2017119874 A1 | 7/2017 |
| WO | 2017169420 A1 | 10/2017 |
| WO | 2018012221 A1 | 1/2018 |
| WO | 2018047747 A1 | 3/2018 |
| WO | 2018166443 A1 | 9/2018 |
| WO | 2019021040 A1 | 1/2019 |
| WO | 2019051406 A1 | 3/2019 |
| WO | 2019123270 A1 | 6/2019 |
| WO | 2019236032 A2 | 12/2019 |
| WO | 2020018130 A2 | 1/2020 |
| WO | WO2020079709 A1 | 4/2020 |
| WO | WO2020208402 A1 | 10/2020 |
| ZA | 20043509 B | 7/2005 |

\* cited by examiner

MULTI-USE FUEL FILLER TUBE

FIELD OF THE DESCRIPTION

This application relates to fuel filler tubes connected to fuel tanks for conducting fuel into tanks and, more particularly, to the attachment of caps to fuel filler tubes.

BACKGROUND

All vehicles having internal combustion engines include some type of fuel (e.g., gasoline, diesel, etc.) tank. The fuel tank is often centrally located under the vehicle. A fuel filler tube extends from the fuel tank to a point on or near the exterior (i.e., the neck of the filler tube) of the vehicle to receive a nozzle dispensing fuel. The exterior end of the filler tube may be referred to as the "neck" or "filler neck" of the tube, which receives the nozzle. When not being filled, the fuel filler tube is typically covered by a fuel cap. In addition to keeping out contaminants, the fuel cap may additionally enable the venting of evaporated fuel. The fuel caps used in a given region may vary. Some vary as required by differing laws, for example. Implementing multiple fuel filler tubes for multiple types of caps increases the cost of manufacturing since multiple parts must be designed, manufactured, and stored. Once a particular type of filler tube is installed in a vehicle, the vehicle becomes specific to a region, which complicates inventory management.

It would be an advancement in the art to provide a fuel filler tube that is compatible with multiple types of fuel caps.

SUMMARY

In one aspect of the disclosure a fuel tube includes a tube wall having an inner surface and an outer surface, the inner surface defining a channel. A first thread is formed on the inner surface for engaging a fuel cap of a first type. A second thread is formed on the outer surface for engaging a fuel cap of a second type.

The first thread and the second thread may overlap one another. For example, at least 80 percent of the first thread is coextensive with the second thread along a central axis of the channel. The first thread and second thread may be monolithically formed with the tube wall.

In some embodiments, the outer surface defines a cylindrical portion and a recessed portion encircling the tube wall, the recessed portion being offset inwardly from the cylindrical portion. The second thread may be formed on the recessed portion. In some embodiments, the second thread does not extend into the cylindrical portion. In some embodiments, the outer surface defines a widened portion having the recessed portion positioned between the widened portion and the cylindrical portion. The widened portion may extend outwardly from the recessed portion.

In some embodiments, one or more attachment structures are secured to the tube wall and configured to secure the tube wall to a fuel tank. The widened portion may be positioned between the one or more attachment structures and the recessed portion. In some embodiments, the one or more attachment structures include one or more flanges encircling the tube wall. In some embodiments, the one or more attachment structures include a first flange and a second flange encircling the tube wall.

In some embodiments, the tube wall is made of a thermoplastic. The tube wall, the first thread, and the second thread may be co-molded. The fuel tube may be fused to a thermoplastic fuel tank. The tube wall may have a conical portion.

In some embodiments, a method includes manufacturing a plurality of fuel tubes according to any of the embodiments described above. First fuel caps are engaged with the first threads of a first portion of the plurality of fuel tubes. Second fuel caps are engaged with the second threads of a second portion of the plurality of fuel tubes, the second fuel caps being of a different type than the first fuel caps. The plurality of fuel tubes may be secured to a plurality of fuel tanks, such as by molding the plurality of fuel tanks around the plurality of fuel tubes. The plurality of fuel tanks may be mounted to a plurality of vehicles.

A first portion of the plurality of vehicles including the first portion of the plurality of fuel tubes may be shipped to a first region. A second portion of the plurality of vehicles including the second portion of the plurality of fuel tubes may be shipped to a second region that is different from the first region.

BRIEF DESCRIPTION OF THE DRAWINGS

Preferred and alternative examples of the present disclosure are described in detail below with reference to the following drawings.

DETAILED DESCRIPTION OF THE PREFERRED EMBODIMENT

Figure 1:
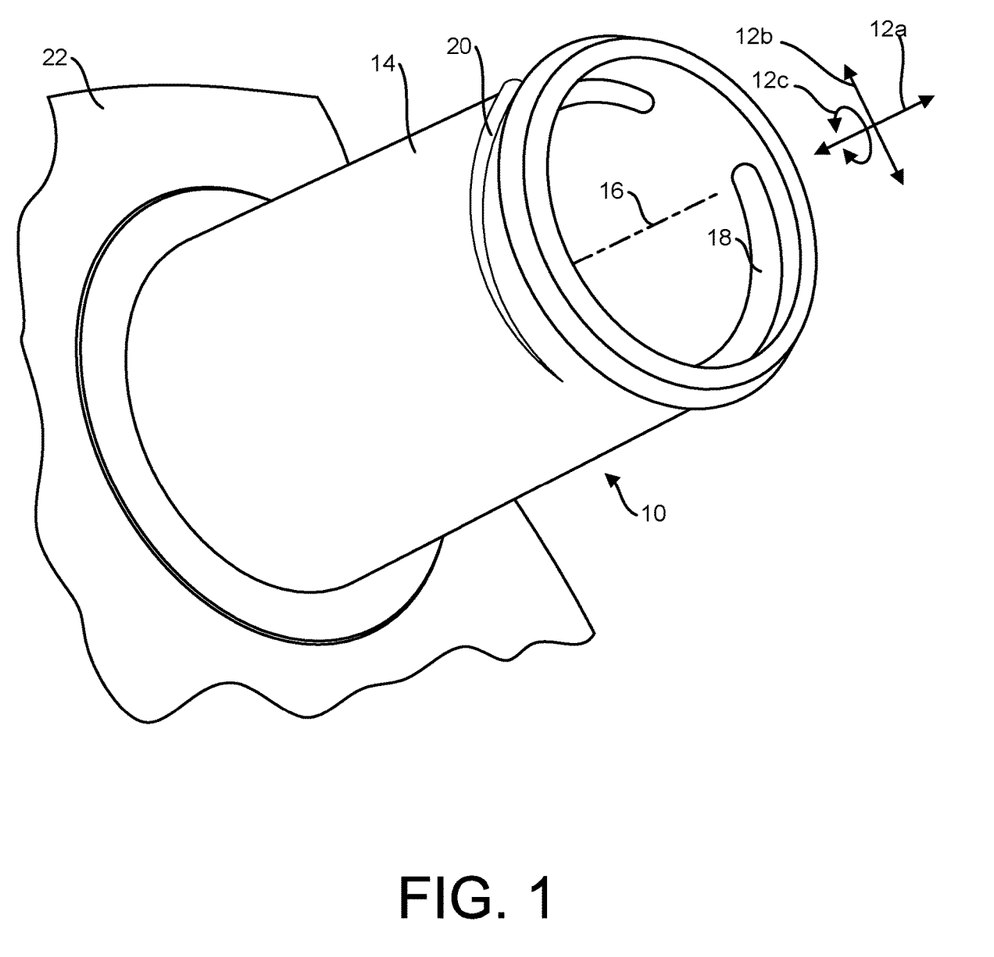
FIG. 1 is an isometric view of a fuel filler tube in accordance with an embodiment of the present disclosure.
Figure 2:
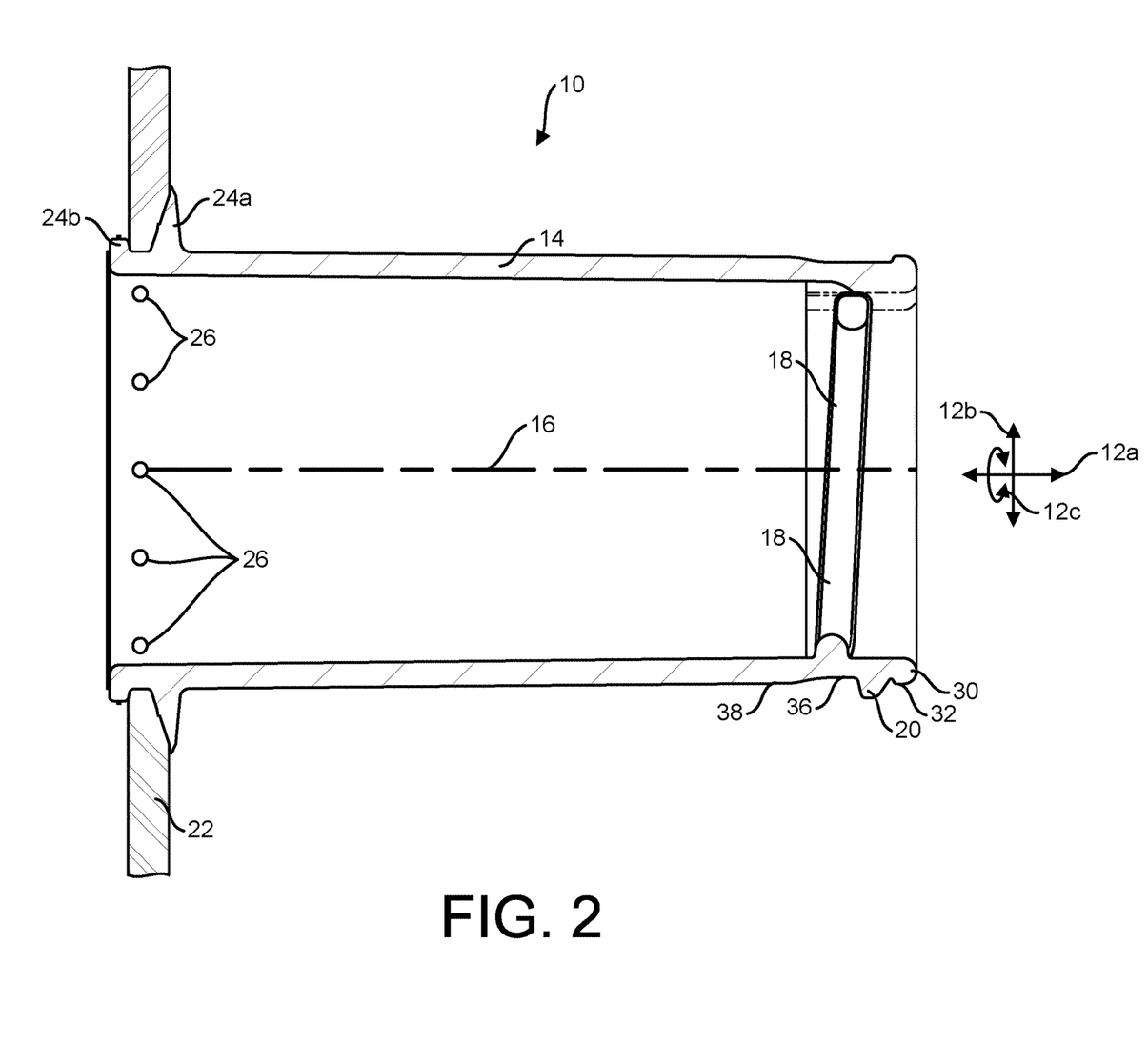
FIG. 2 is a cross-sectional view of the fuel filler tube of FIG. 1.

Referring to FIGS. 1 and 2, a fuel filler tube 10 may be understood with respect to an axial direction 12a, radial direction 12b, and a circumferential direction 12c. The axial direction 12a may be defined as extending along the centroid of the channel defined by the wall 14 of the fuel filler tube. The wall 14 may have interior and exterior surfaces that are cylindrical or conical (i.e., frustrum of a cone) or some other shape that is symmetrical about its centroid. The interior and exterior surfaces of the wall 14 may also include curved portions, e.g., defined a tube with a curved channel. Inasmuch as the tube wall 14 interfaces with a fuel cap, a portion of the tube wall 14 may be cylindrical. The axial direction 12a may therefore be understood as the axis of symmetry 16 of the cylindrical portion. The radial direction 12b may be understood as pointing outwardly from the axis of symmetry 16 and perpendicular to the axis of a symmetry 16 in a plane parallel to and including the axis of symmetry. The circumferential direction 12c may be understood as being along a curved line centered on the axis of symmetry 16 and lying in a plane that is perpendicular to the axis of symmetry 16 and parallel to the radial direction 12b.

The tube wall 14 and other structures described below as forming part of the filler tube 10 may be made of various materials. Although metal, such as steel or aluminum may be used, many applications may use filler tubes 10 made of a thermoplastic such as polyamide or polyethylene. In other applications, a thermoplastic such as AKULON® can be used.

The tube wall 14 may have an internal thread 18 formed on an interior surface thereof. The tube wall 14 may have an external thread 20 formed on an exterior surface thereof. In the illustrated embodiment, the internal thread 18 and external thread 20 are both formed on the cylindrical portion of the tube wall 14. The thread 18 and external thread 20 may be completely or partially coextensive with one another along the axial direction 12a. For example, at least 80 percent of the internal thread 18 may overlap the external thread 20 along the axial direction 12a. In other embodiments, there is no overlap between the internal thread 18 and the external thread 20 along the axial direction 12a. In various embodiments, depending on the caps used, the threads could overlap 100% or not at all.

The pitches of the internal thread 18 and external thread 20 may be the same or different and conform to the fuel cap with which they are designed to interface. The depth of the internal thread 18 and external thread 20 may be the same or different and likewise conform to the fuel caps with which they are designed to interface. The internal thread 18 and external thread 20 may make one complete revolution about the axis of symmetry 16, a partial revolution (e.g., between 315 and 360 degrees), or more than one complete revolution. The number of revolutions of the internal thread 18 and external thread 20 may be the same or different.

The filler tube 10 may be made at the same time as the fuel tank 22 to which it secures or be secured to the fuel tank during or after manufacture. For example, for a small off-road vehicle such as a snowmobile, side-by-side, or all-terrain vehicle (ATV), the fuel tank may be formed by rotomolding. The filler tube 10 may be secured to the mold used such that the plastic forming the fuel tank fuses to the filler tube 10 during the rotomolding process. In the illustrated embodiment, the fuel filler tube 10 includes one or more flanges 24a, 24b to facilitate this process. For example, a first flange 24a may be positioned on the outer surface of the finished fuel tank whereas the second flange 24b is positioned on the inner surface of the finished fuel tank. During molding, plastic flows between the flanges 24a, 24b such that the flange 24b resists removal after the plastic has solidified. A row of openings 26 may be positioned between the flanges 24a, 24b. During molding, the plastic may further flow into these openings 26 to further enhance bonding of the fuel filler tube 10 to the fuel tank. Other features may also be formed on the fuel filler tube 10 to facilitate securement. In some embodiments, portions of the filler tube 10 may melt and fuse with the plastic forming the fuel tank. The type of plastic used to form the fuel tank 22 may be the same as or different from that used to form the fuel tank.

In other embodiments, the filler tube 10 is fastened to the fuel tank 22 by means of welding, such as hot-plate or sonic welding. In such embodiments, one or both of the flanges 24a, 24b and the openings 26 may be retained or omitted.

Figure 3:
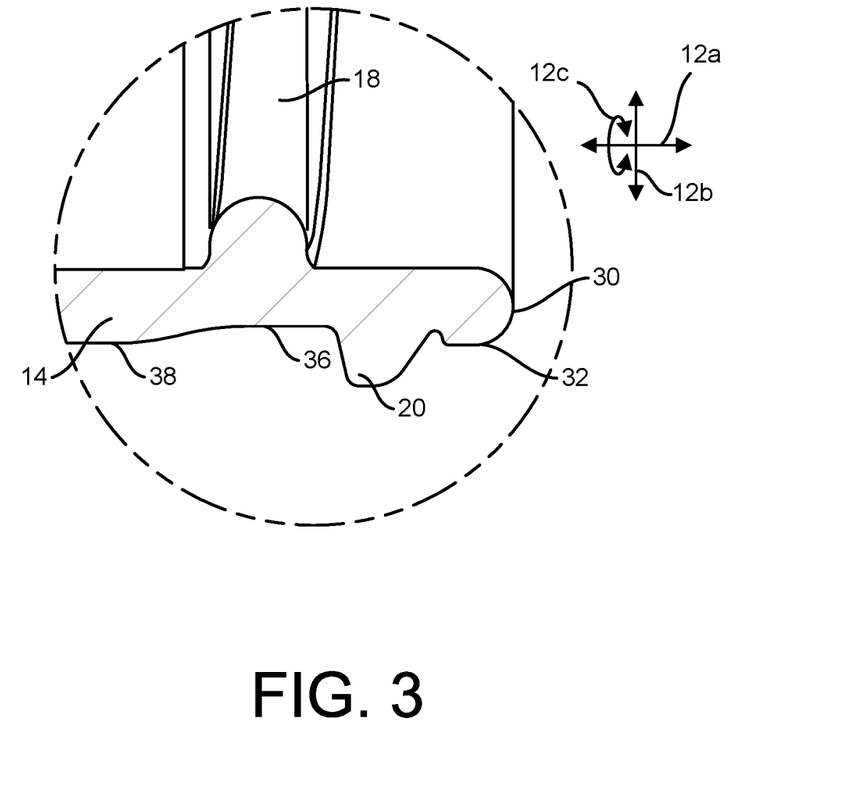
FIG. 3 is a partial cross-sectional view of the fuel filler tube of FIG. 1.

Referring to FIG. 3, while still referring to FIGS. 1 and 2. In some instances, the standard for the fuel cap (not shown) that will be used with the internal thread 18 ("the internal fuel cap") and the standard for the fuel cap that will be used with the external thread 20 ("the external fuel cap") use differently sized tube walls. For example, the internal fuel cap may use an external diameter $D_I$ that is larger than the external diameter $D_E$ used by the external fuel cap.

In some embodiments, the distal end of the fuel filler tube 10 (relative to the fuel tank to which it secures) may include a rounded rim 30 that transitions to a cylindrical portion 32 that is tangent to the rounded rim 30. The cylindrical portion 32 may be symmetrical about the axis of symmetry 16 and have the diameter $D_I$. The cylindrical portion 32 has a height $H_I$ along the axial direction 12a. The height $H_I$ and diameter $D_I$ may be selected to contact a shroud secured to a dispensing nozzle to reduce escaping vapors when filling the fuel tank to which the filler tube 10 is secured. In some embodiments, $H_I$ is between 0.2 and 2 mm, such as between 0.5 and 0.75 mm.

The tube wall 14 may have a recessed portion 36 having the diameter $D_E$ about the axis of symmetry 16. The external thread 20 may be formed on the recessed portion 36 and may be omitted from the cylindrical portion 32. In some embodiments, the extent of the recessed portion 36 along the axial direction 12a may be substantially equal to the extent of the external thread 20 in the axial direction 12a. For example, in some embodiments, the recessed portion 36 extends outwardly from the external thread 20 no more than 1 mm, 0.5 mm, or 0.1 mm along the axial direction 12a. In some embodiments, the internal thread 18 is also completely overlapped by the recessed portion 36 along the axial direction 12a.

The recessed portion 36 may be positioned such that the cylindrical portion 32 is closer to the distal end of the filler tube 10. In other words, the cylindrical portion 32 may be positioned between the recessed portion 36 and the rounded rim 30. There may be a tapered or rounded transition between the cylindrical portion 32 and the recessed portion 36. The recessed portion 36 may be substantially cylindrical, e.g., each point being within 0.1 mm from a cylinder centered on the axis of symmetry 16. The cylindrical portion 32 extends outwardly from the recessed portion by an amount substantially (e.g., within 5 percent of) equal to $(D_E-D_I)/2$. For example, the amount of overhang may be between 0.25 and 0.755 mm. For example, the amount may be substantially equal to 0.5 mm.

The recessed portion 36 may extend to the fuel tank 22. In the illustrated embodiment, the recessed portion 36 is followed by a non-recessed portion 38 that has a greater diameter about the axis of symmetry 16 than the recessed portion 36. There may be a tapered and/or rounded transition between the recessed portion 36 and the non-recessed portion 38. Following the transition, the non-recessed portion 38 may have a diameter that is equal to or different from $D_I$. The outer diameter of the non-recessed portion 38 following the transition may increase with distance from the recessed portion 36 along the axial direction 12a such that the non-recessed portion 38 defines a surface conforming to a cone. The interior surface of the tube wall 14 opposite the non-recessed portion 38 may also conform to a smaller cone such that the tube wall has substantially constant thickness along the non-recessed portion 38.

Figure 4:
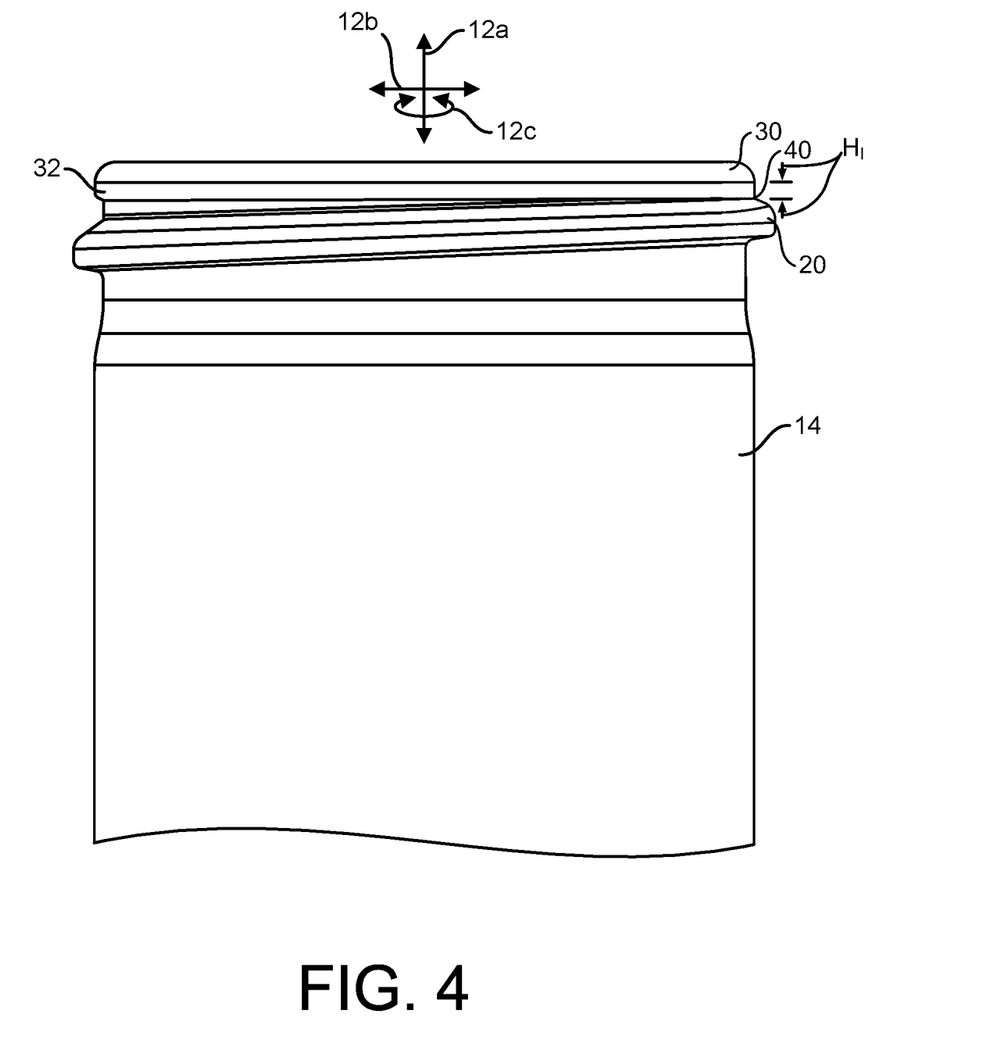
FIG. 4 is a side view of the fuel filler tube of FIG. 1.

Referring to FIG. 4, the topmost portion 40 of the external thread 20 may be positioned at or below the bottom edge of the cylindrical portion 32 such that there is an extent of the cylindrical portion 32 is at least $H_I$ along the axial direction without any portion of the external thread 20 formed thereon.

The filler tube 10 as described herein is usable with at least two different types of fuel caps. In one application, a manufacturer makes a plurality of filler tubes 10 and mounts them to a plurality of fuel tanks 22. The fuel tanks are installed in a plurality of vehicles. The vehicles at this point are not differentiated based on fuel cap used. Once a first portion of the plurality of vehicles arrive at a first geographic location, a first type of fuel cap may be mounted to the filler tubes 10 thereof, such as in engagement with the internal thread 18. Once a second portion of the plurality of vehicles arrive at a second geographic location, a second type of fuel cap may be mounted to the filler tubes 10 thereof, such as in engagement with the external thread 20. Alternatively, the fuel cap for a given geographic region may be secured to the filler tube 10 of a vehicle as soon as it is determined that the vehicle is to be shipped to the geographic region. In this manner, vehicles are undifferentiated and need not have separate part numbers, inventory management, or storage locations. If a vehicle in the first geographic location needs to be moved to the second geographic location, for example, it is simple to replace the first type of fuel cap with the second type of fuel cap.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A fuel tube for engagement with a wall of a fuel tank comprising:
    a single-piece tube wall having an inner surface and an outer surface, the inner surface defining a channel, the tube wall having an inner end for engagement with the wall of the fuel tank and an outer end for engagement with at least two types of fuel caps;
    a first thread formed on the inner surface of the tube wall near the outer end of the tube wall, the first thread for engaging a fuel cap of a first type, the first thread extending inwardly from the inner surface;
    a second thread formed on the outer surface of the tube wall near the outer end of the tube wall, the second thread for engaging a fuel cap of a second type, the second thread extending outwardly from the outer surface; and
    a first flange and a second flange extending generally radially outwardly from and encircling the tube wall at the inner end of the channel, the first and second flanges being for engagement with the fuel tank wall with one of first flange and second flange for engagement with an inner surface of the fuel tank wall and another of first flange and second flange for engagement with an outer surface of the fuel tank wall.

* * * * *